United States Patent [19]

Boutet et al.

[11] Patent Number: 4,970,394

[45] Date of Patent: Nov. 13, 1990

[54] APPARATUS FOR READING-OUT STIMULABLE PHOSPHOR, RADIOGRAPHIC RECORDING ELEMENTS

[75] Inventors: John C. Boutet, Rochester; Anthony R. Lubinsky, Webster; Bruce R. Whiting, Pittsford, all of N.Y.

[73] Assignee: Eastman Kodak Company, Rochester, N.Y.

[21] Appl. No.: 456,438

[22] Filed: Dec. 26, 1989

[51] Int. Cl.⁵ ............................................. G01N 23/04
[52] U.S. Cl. .................................. 250/327.2; 250/368
[58] Field of Search ................. 250/327.2, 484.1, 368

[56] References Cited

U.S. PATENT DOCUMENTS 3,769,509 10/1973 Martone et al. .................... 250/368
4,680,473 7/1987 Matsuda et al. ............... 250/484.1 B
4,816,688 3/1989 Saotome ...................... 250/327.2 E Primary Examiner—Carolyn E. Fields
Attorney, Agent, or Firm—Warren W. Kurz

[57] ABSTRACT

To minimize the adverse effects of "flare" in reading-out stimulable phosphor recording elements, the light-collecting face of a photodetector is provided with a multiplicity of sharp, light-transparent, optical projections. By a combination of reflections and refractions, such optical projections serve to absorb substantially all incident photons thereby preventing phosphor-stimulating photons from being reflected by the photodetector's light-collecting face and exciting non-addressed regions of the recording element. Preferably, the optical projections take the form of a sawtooth array of optical wedges; however, pyramid-shaped and cone-shaped projections are also disclosed.

8 Claims, 5 Drawing Sheets

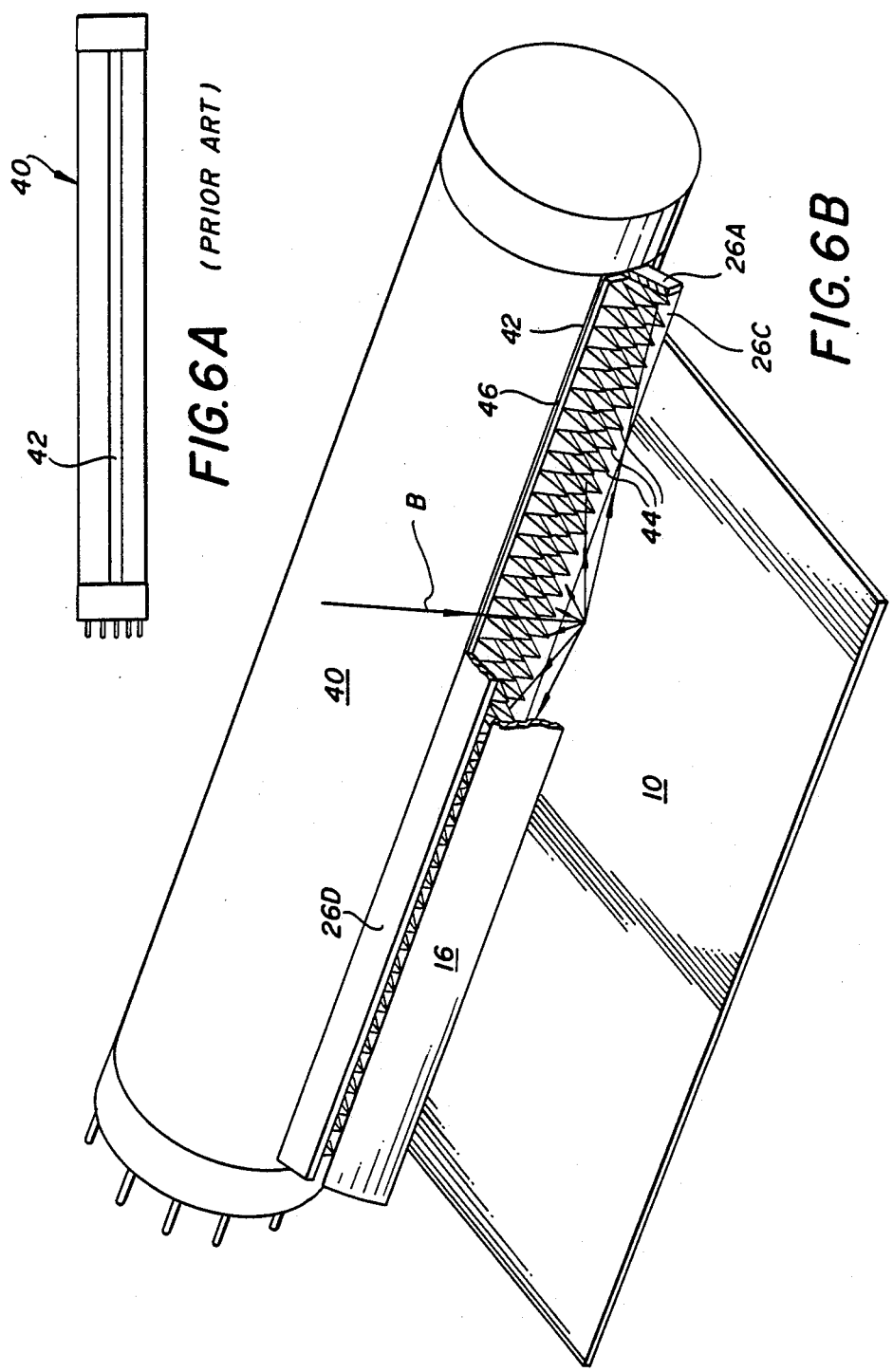

APPARATUS FOR READING-OUT STIMULABLE PHOSPHOR, RADIOGRAPHIC RECORDING ELEMENTS

BACKGROUND OF THE INVENTION

The present invention relates to the field of computed radiography. More particularly, it relates to improvements in apparatus for recovering the image information contained by a previously exposed radiographic recording element comprising a stimulable phosphor.

U.S. Pat. No. 3,859,529 (Re. No. 31,847) to G. W. Luckey discloses the basic concept of using stimulable phosphors to record x-ray patterns and of recovering (reading-out) such patterns by scanning such phosphors with a beam of radiation adapted to stimulate luminescence (fluorescence or phosphorescence) from the x-ray exposed portions of the phosphor. During the scan-stimulation process, the phosphor luminescence is detected by a photodetector (e.g., a photomultiplier tube) to provide an electrical signal representative of the recorded x-ray pattern. Such signal may, if desired, be digitized and processed, through suitable algorithms, to reduce noise, enhance edges, increase contrast, etc. The processed electrical signal may then be used, for example, to intensity-modulate a scanning laser beam to record the x-ray pattern on a photosensitive film or the like.

In using the Luckey process for the purpose of diagnostic radiography (e.g., for mammography) relatively low levels of x-ray radiation are used to record the desired x-ray pattern. Since the stimulated luminescence intensity is proportional to the intensity of x-radiation received by the image-storing phosphor, it will be appreciated that the stimulated luminescence level can be very low, especially for such diagnostic radiographic applications. To produce useful images, a major portion of the stimulated luminescence must be collected for use in producing the image signal.

U.S. Pat. No. 4,346,295 issued to Tanaka et al. discloses an optical arrangement for efficiently collecting a major portion of the luminescence given off by the image-storing phosphor during the scan-stimulation step. In the Tanaka et al. reference, a laser beam scans the phosphor, point by point, along a rectilinear image line. A light guide member, made of a transparent sheet having smooth surfaces for effecting total internal reflection, is arranged so that a flat, linear surface thereof is closely spaced with respect to the scan line on the stimulable phosphor. Such flat surface is typically 5–8 mm in width and is sufficiently long to span the phosphor plate (about 100–400 mm). As the scanning laser beam stimulates the phosphor, the stimulated luminescence enters the light guide through the flat end thereof and is internally reflected toward a distal end which is curled to form an annulus. A photomultiplier tube is optically coupled to the annular end of the light guide to detect the luminescence transmitted by the light guide.

While the luminescence-detecting apparatus disclosed by Tanaka et al is relatively efficient at collecting a large percentage of the photons constituting the luminescence given off by the stimulated phosphor, a significant percentage of these photons are reflected by the flat surface of the light-guide member and, thus, are not detected by the photomultiplier tube. More significantly, however, is the fact that the stimulating radiation, which can be $10^8$ times more intense than the stimulated luminescence, also gets reflected by the flat surface of the light-guide. A major portion of this reflected stimulating radiation is returned to the phosphor plate and acts to prematurely stimulate luminescence from non-addressed regions of the plate, i.e., those regions not directly irradiated by the scanning laser beam. Such reflected stimulating radiation, known as "flare," has the adverse effects of adding background noise to the system, thereby reducing the signal-to-noise ratio of the read-out signal. Moreover, it gives rise to false signals and ghost images which substantially degrade the quality of the ultimate image.

SUMMARY OF THE INVENTION

In view of the foregoing discussion, an object of this invention is to minimize the production of "flare" during read-out of a latent image-stored by a stimulable phosphor plate. According to the present invention, there is provided a low reflectance, high transmission optical surface which is particularly adapted for use in image read-out apparatus of the above type, for reducing the amount of radiation reflected from the input face of the luminescence-detection device. Such surface comprises a multiplicity of sharp, tapered projections of a light-transparent material which, by way of multiple reflections, serves to trap incident photons and thereby couple such photons into the light-transparent material thereof. Preferably, such projections are in the form of wedges, pyramids, or cones, each having an aspect ratio, defined by the ratio of the height to base dimensions, of at least 3:1. The projections may be formed on the light-collecting surface of the aforementioned light guide. Alternatively, they may be formed directly on the light-collecting face of an elongated photomultiplier tube or the like.

The invention and its various advantages will become more apparent to those skilled in the art from the ensuing detailed description of preferred embodiments, reference being made to the accompanying drawings wherein like reference characters denote like parts.

BRIEF DESCRIPTION OF THE DRAWINGS

FIG. 6A is a schematic front elevation of a known type of photomultiplier tube;

FIG. 6B is a schematic perspective illustration showing the input face of the tube shown in FIG. 6A modified in accordance with a preferred embodiment of the invention;

DETAILED DESCRIPTION OF PREFERRED EMBODIMENTS

Figure 1:
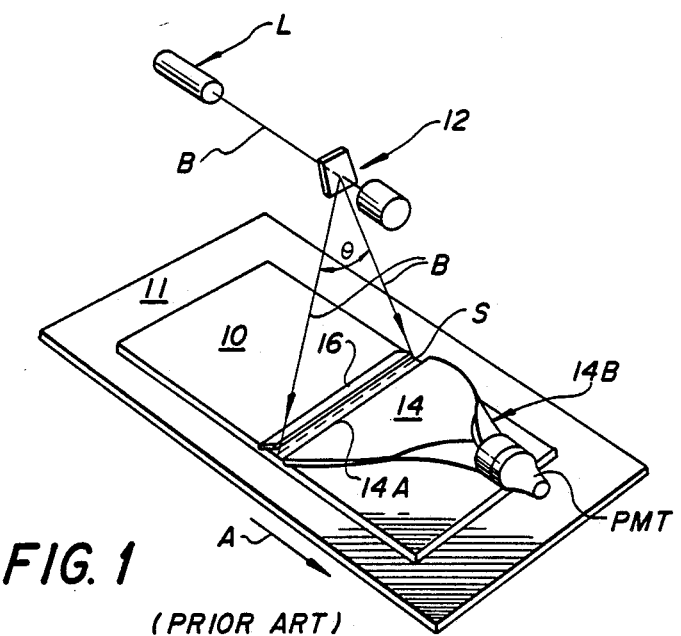
FIG. 1 is a perspective illustration of prior art apparatus for reading-out a radiographic image captured by an image-storing phosphor plate.
Figure 2:
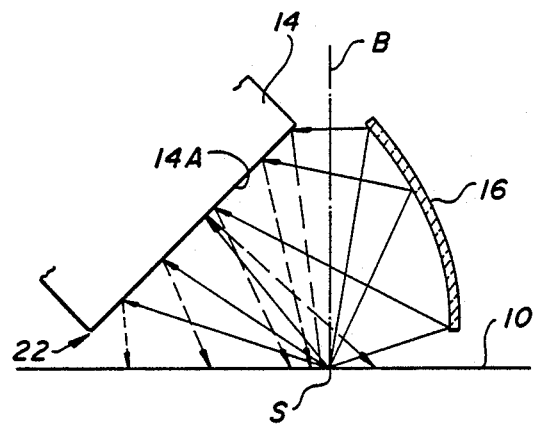
FIG. 2 is a schematic side view of the prior art apparatus shown in FIG. 1.

Referring now to the drawings, FIGS. 1 and 2 schematically illustrate a known apparatus for reading-out a latent, x-ray produced, image-stored in a stimulable phosphor plate 10 disposed on a support 11. Such apparatus is disclosed, for example, in the aforementioned U.S. Pat. No. 4,346,295. It includes a continuous wave laser L for producing a radiation beam B, and a motor-controlled deflector 12 which operates, in a well known manner, to repeatedly scan the beam through an angle $\theta$, whereby the beam scans the phosphor plate along a linear scan line S as the plate is advanced in a perpendicular direction, as indicated by the arrow A. The radiation beam produced by laser L is of a wavelength adapted to excite the phosphor of plate 10 and thereby cause the plate to luminesce (fluoresce or phosphoresce) in those regions which were previously image-wise exposed to x-radiation. To detect the photons constituting the luminescence stimulated from plate 10, there is provided a photodetector, usually in the form of a photomultiplier tube PMT, which is optically coupled to such luminescence by means of a light-guide member 14 comprising a transparent sheet of acrylic resin or the like. The light-guide has a flat, linear and elongated face 14A which is positioned in close proximity to the scan line S. Face 14A is typically 5 to 8 mm in width and 300-400 mm in length. An opposing end 14B of the light-guide is curled in the manner shown to provide a flat, annular surface which is optically coupled to the photodetector.

In operation, deflector 12 functions to scan laser beam B across the phosphor plate causing luminescence photons to be emitted in all directions from the scan line S. Most of these photons will strike the light-guide face 14A, either directly or indirectly (after being reflected by mirror 16) and be optically coupled to the photodetector by multiple internal reflections within the light-guide. A small percentage (e.g., less than 5%) of the luminescing photons will strike face 14A and be reflected back toward the phosphor plate, as indicated by the dashed paths shown in FIG. 2. These photons go undetected and represent a loss to the detection system. But not being of the phosphor-stimulating wavelength, these reflected luminescence photons have no significant effect on the read-out of the phosphor plate. This is not the case, however, for the unabsorbed photons of the stimulating beam B which, upon being reflected by the phosphor plate, travel the same paths as the luminescing photons. Upon being reflected from light-guide face 14A, these phosphor-stimulating photons again strike the phosphor, get absorbed, and cause the phosphor to luminesce in locations spaced from the point of incidence of the stimulating beam. The result is the aforementioned "flare" problem and the false results it produces. As indicated above, an object of this invention is to minimize flare in optical read-out apparatus of the type shown in FIGS. 1 and 2.

Figure 3:
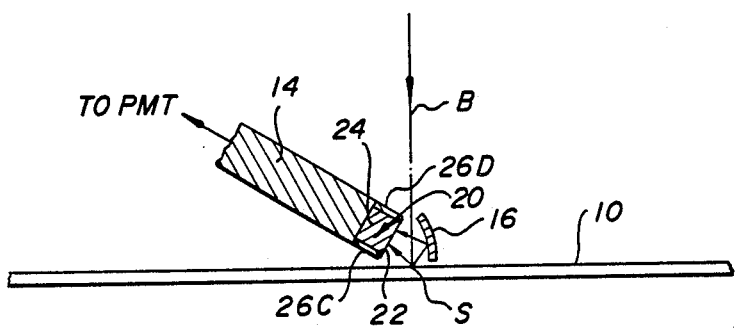
FIGS. 3 and 4 are schematic cross-section and top views, respectively, of a portion of an optical read-out apparatus embodying a preferred form of the invention.
Figure 4:
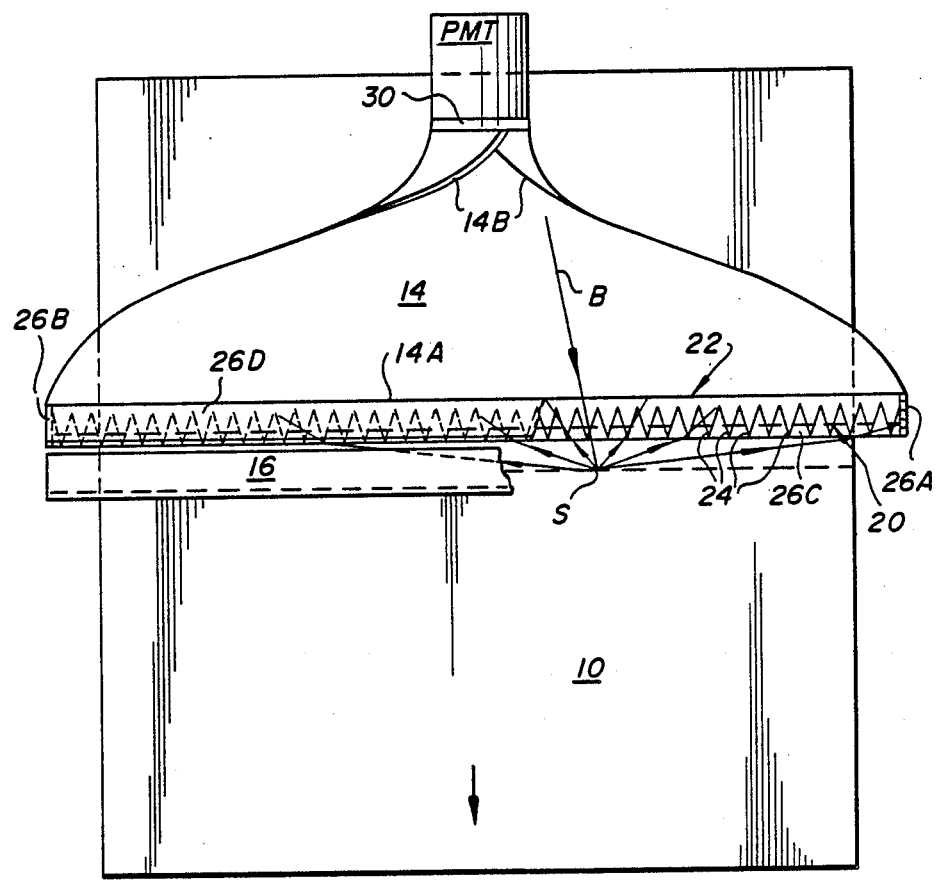
Figure 5:
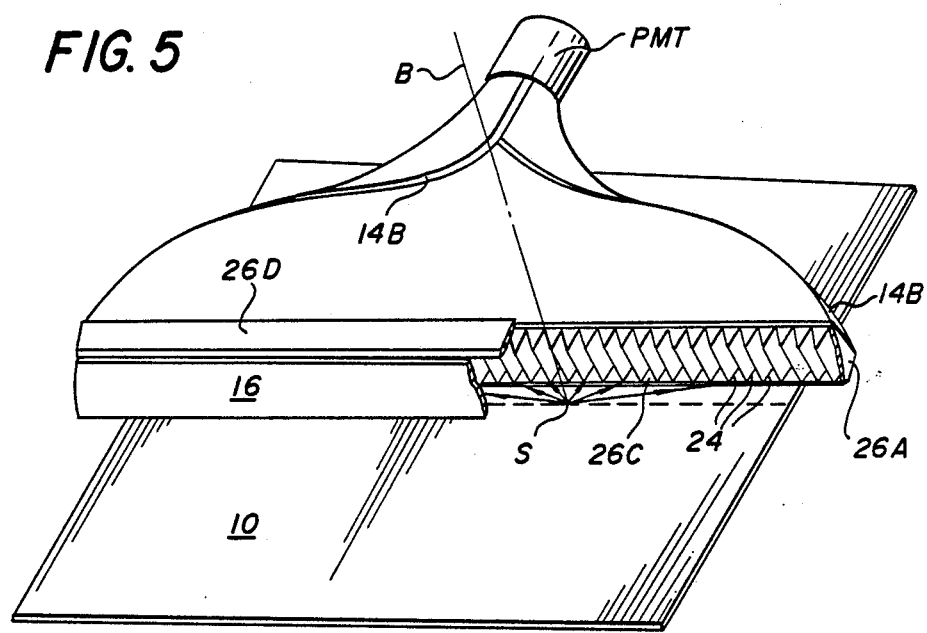
FIG. 5 is a schematic front perspective view illustrating the optical read-out apparatus shown in FIGS. 3 and 4.

Referring to FIGS. 3-5, the above-noted object of the invention is achieved by the provision of a low reflectance, high transmission optical surface 20 at the air/light-guide interface 22. Such surface serves to substantially eliminate the flare problem by more efficiently optically coupling the reflected phosphor-stimulating radiation into the light-guide, thereby preventing such radiation from being redirected back to the phosphor plate. Moreover, face 20 more efficiently couples the luminescence photons stimulated by the scanning laser beam B with light-guide 14 and, hence, with the photodetector (PMT). According to a preferred embodiment, surface 20 comprises a multiplicity of optical projections 24, each extending outwardly from the light-guide's elongated face 14A and tapering to a sharp edge or point. The projections are made of a material which is highly transmissive to the stimulated luminescence so as to transmit incident photons to the light-guide member. Preferably, such material highly absorbs the wavelength of the phosphor-stimulating radiation so that such radiation is not detected by the PMT. Alternatively, a bandpass filter 30 may be inserted in the optical path between the light-guide and PMT to absorb such phosphor-stimulating radiation. Projections 24 may be integral with the light-guide, being formed by a stamping or molding process, or may be a separate cast part which is bonded, by a suitable optical adhesive, to face 14A.

In the embodiment illustrated in FIGS. 3-5, projections 24 are in the form of two-sided optical wedges. The apex angle of each wedge element is chosen so as to be sufficiently small that substantially all incident photons will either be refracted by the wedge material, and thereby immediately coupled into the light-guide, or, alternatively, reflected toward another wedge element, whereupon it will have multiple chances to be refracted by the wedge material. Photons which are reflected toward the boundaries of the projection array are redirected toward the projections by reflectors 26A-26D which surround surface 20. To assure that substantially all incident photons are optically coupled into the light-guide, the height-to-height base aspect ratio of each projection should be at least 3:1. Such an aspect ratio assures that the wedge faces are sufficiently steep as to reflect incident photon deeper into the projection array (i.e., toward the bases of the wedges).

Since most of the photons entering the light guide do so at a relatively large angle of incidence, they will undergo a larger number of internal reflections prior to arriving at the photodetector. To enhance the coupling efficiency of these photons with the photodetector, it is preferred that the edges 14B of the light-guide be provided with a highly reflective coating. As noted above, a suitable optical filter 30 prevents photons of the phosphor-stimulating wavelength from being detected by photodetector.

Figure 7:
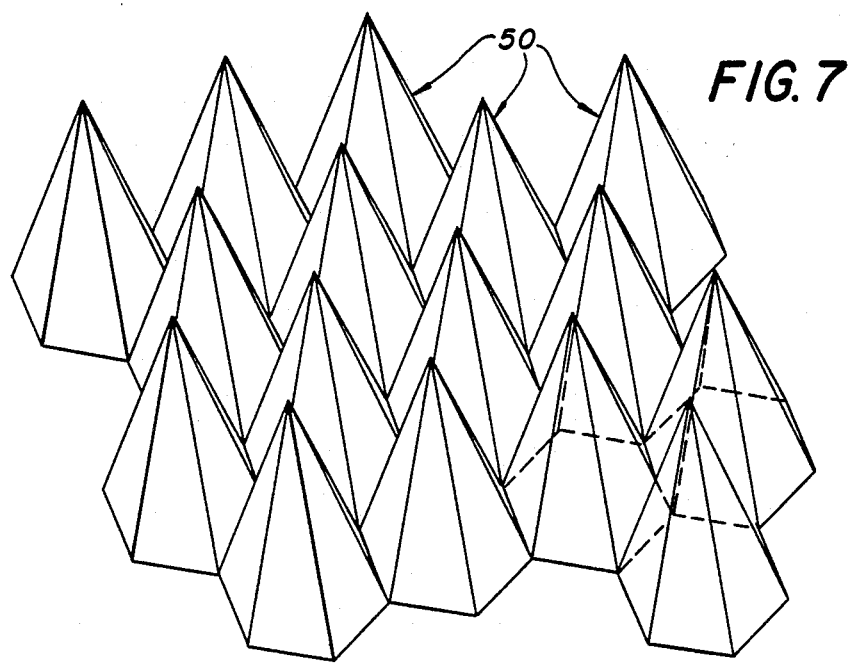
FIG. 7 is an enlarged perspective view illustrating the relationship of the pyramidal-shaped optical projections.
Figure 8:
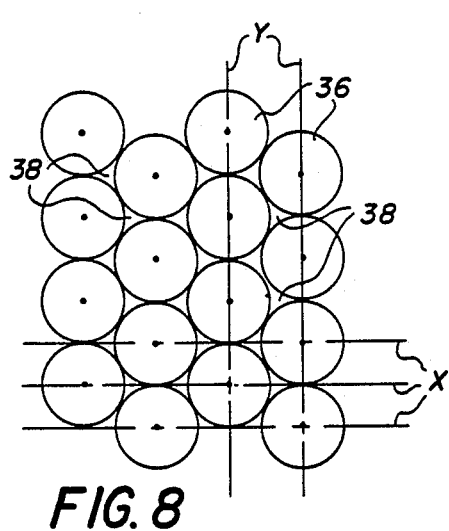
FIGS. 8 and 9 are schematic top plan views illustrating alternative packing arrangements for cone-shaped optical projections.
Figure 9:
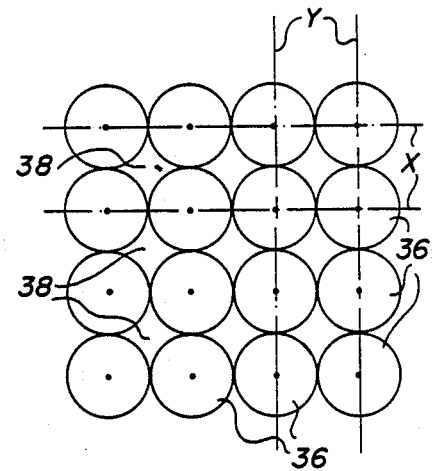

While the low-reflectance, high transmission optical surface 20 may be formed on the input face of a light-guide, as described above, it may be applied directly to the input face of a suitable photomultiplier tube. In FIG. 6A, there is illustrated an elongated photomultiplier tube 40 having an elongated window 42 (e.g., 8 mm in width and 400 mm in length) for transmitting incident photons to a photocathode. Such a photomultiplier tube is disclosed in IEEE Transactions on Nuclear Science, Vol. 36, No. 1, February 1989. In accordance with another embodiment of the invention, the input window of such a device is provided with a low-reflectance, high transmission optical surface comprising a plurality of tapered optical projections. As shown in FIG. 6B, such projections may take the shape of four-sided pyramids 44, each terminating in a sharp point and having an aspect ratio of at least 3:1. Here, the optical surface can be produced by molding or casting techniques to form a discrete part which can be cemented, using a transparent adhesive of suitable refractive index, to window 42. An optical bandpass filter 46 is positioned to absorb photons of the phosphor-stimulating wavelength and to transmit the shorter wavelength luminescence photons. Obviously, the optical projections from window 42 may take other forms, such as the aforementioned wedge shaped projections, the six-sided pyramids 50 shown in FIG. 7, or the cone-shaped projections, as indicated in FIGS. 8 and 9.

Compared to the pyramidal and wedge-shaped projections described above, the cone-shape projections cannot be packed together so tightly as to eliminate flat spaces 38 between adjacent cones. Of course, such spaces are disadvantageous in that incident photons can reflect from them and produce flare. The area of such surfaces can be minimized, however, by arranging the cones in the hexagonal close pick array pattern shown in FIG. 8, rather than the more orderly square pattern shown in FIG. 9 in which the cone axes are arranged at all intersections of the mutually perpendicular lines (X and Y) along which the cone axes are located. Alternatively, to avoid any flat spaces at all between adjacent cones, the plane which cuts the cones at the location shown in FIGS. 8 and 9, could be further displaced from the cone vertices, to a location at which all of the cone bases merge together.

Figure 10:
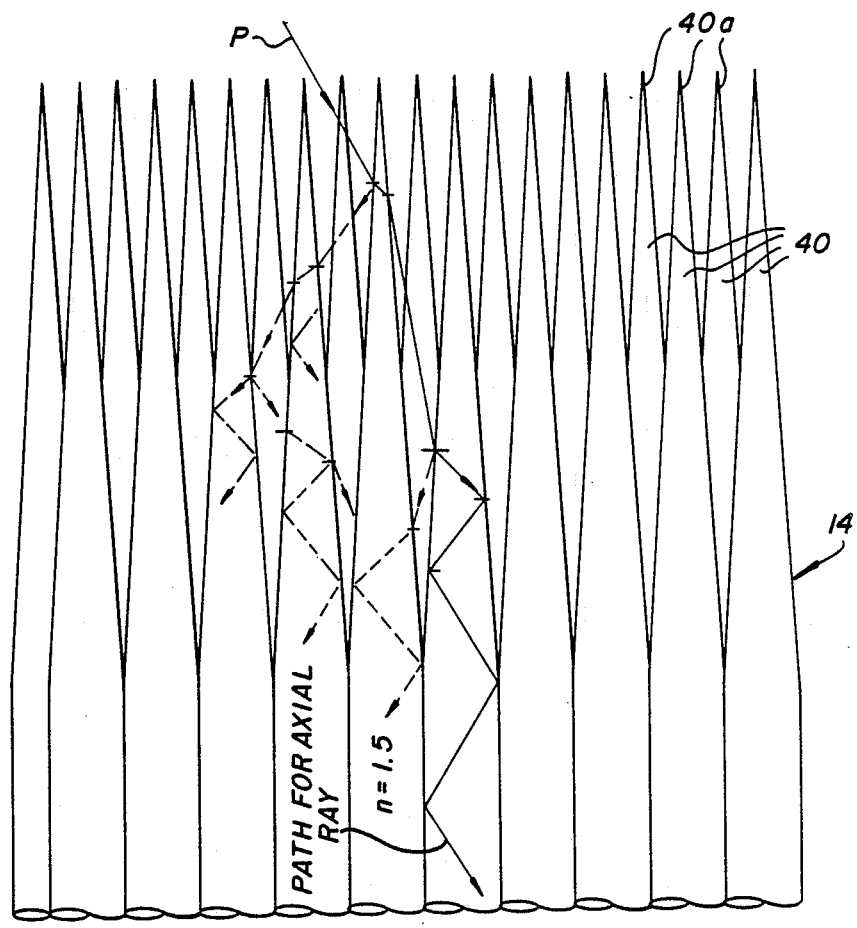
FIG. 10 illustrates the light-trapping effect of optical fibers having tapered or cone-shaped ends.

In FIG. 10, light-guide 14 is shown in the form of a bundle of optical fibers 40 having tapered ends 40a. A photon entering the bundle along path P can either be refracted or reflected by an individual fiber, and various possible optical paths are shown. Once the photon has entered the fiber, it is thereafter totally internally reflected until it arrives at the photodetector. Such tapered fibers can be produced by a heating and stretching process.

The invention has been described in detail with particular reference to certain preferred embodiments thereof, but it will be understood that variations and modifications can be effected within the spirit and scope of the invention.

We claim:

1. In apparatus for reading-out an x-ray pattern stored in a stimulable phosphor plate, said apparatus including means for scanning the phosphor plate along a scan line with photons of a first wavelength to stimulate the emission of photons of a second wavelength from the x-ray exposed portions of such phosphor plate, and photodetector means responsive to incident photons of the second wavelength to produce an electrical signal proportional to the number of such photons incident thereon, said photodetector means having an elongated input face positioned in proximity to said scan line to collect incident photons of said second wavelength, the improvement comprising:

means defining a multiplicity of spaced optical projections extending outwardly from said input face, said projections being made of a material substantially transparent to the photons of said second wavelength and having a profile such as to minimize the reflection of any incident photons thereon.

2. The apparatus as defined by claim 1 wherein each projection converges to a point, and wherein the largest base dimensions of each projection is no more than one-third the shortest dimension of said input face.

3. The apparatus as defined by claim 1 wherein said projections have a height dimension, measured in a direction normal to said input face, which is at least three times the narrowest base dimension, measured in a direction parallel to said input face.

4. The apparatus as defined by claim 3 wherein each of said projections has a conical shape.

5. The apparatus as defined by claim 4 wherein said projections are arranged in a rectilinear array in which each of the respective longitudinal axes of the projections is arranged at an intersection of two mutually perpendicular rectilinear lines.

6. The apparatus as defined by claim 3 wherein said projections are arranged in a hexagonal close-pack array in which the base of each projection contacts the respective bases of six other projections.

7. The apparatus as defined by claim 3 wherein each of said projections has a wedge-shape comprising a pair of planar faces which converge along a line, and wherein the shortest base dimension is no more than one-third the shortest dimension of said input face.

8. The apparatus as defined by claim 3 wherein each of said projections has a pyramidal shape comprising at least three planar surfaces which converge to a point.

* * * * *